US011353640B2

(12) United States Patent
Wilding et al.

(10) Patent No.: US 11,353,640 B2
(45) Date of Patent: *Jun. 7, 2022

(54) DURABLE RETROREFLECTIVE ELEMENTS WITH AN IONIC COPOLYMER CORE

(71) Applicant: 3M INNOVATIVE PROPERTIES COMPANY, St. Paul, MN (US)

(72) Inventors: Matthew D. Wilding, White Bear Lake, MN (US); Stephen L. Lieder, Wyoming, MN (US); Eugene H. Carlson, Apple Valley, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 581 days.

This patent is subject to a terminal disclaimer.

(21) Appl. No.: 15/759,044

(22) PCT Filed: Sep. 6, 2016

(86) PCT No.: PCT/US2016/050411
§ 371 (c)(1),
(2) Date: Mar. 9, 2018

(87) PCT Pub. No.: WO2017/044425
PCT Pub. Date: Mar. 16, 2017

(65) Prior Publication Data
US 2020/0241180 A1      Jul. 30, 2020

Related U.S. Application Data

(60) Provisional application No. 62/217,500, filed on Sep. 11, 2015.

(51) Int. Cl.
*G02B 5/128* (2006.01)
*E01F 9/524* (2016.01)
(Continued)

(52) U.S. Cl.
CPC .............. *G02B 5/128* (2013.01); *E01F 9/524* (2016.02); *G02B 5/13* (2013.01); *C08K 3/40* (2013.01); *G02B 5/136* (2013.01)

(58) Field of Classification Search
CPC .......... G02B 5/128; G02B 5/13; G02B 5/136; E01F 9/524; C08K 3/40
(Continued)

(56) References Cited

U.S. PATENT DOCUMENTS 2,937,668 A * 5/1960 Carey, Jr. ................ D06Q 1/04
139/426 R
3,175,935 A    3/1965 Vanstrum
(Continued)

FOREIGN PATENT DOCUMENTS

CA    1006486    3/1977
CA    2481854    3/2006
(Continued)

OTHER PUBLICATIONS

International Search Report for PCT International Application No. PCT/US2016/050411, dated Nov. 29, 2016, 5 pages.
(Continued)

*Primary Examiner* — George G. King
(74) *Attorney, Agent, or Firm* — Carlos M. Téllez Rodriguez; 3M Innovative Properties Company

(57) ABSTRACT

The disclosed retroreflective element includes a highly durable core with an ionic copolymer and a plurality of beads. These disclosed retroreflective properties remain intact even after continued application of external forces and stresses. Further, the ionic copolymer allows for beads to be loaded into the ionic copolymer of the core, securely disposed around the perimeter of the core, or both.

8 Claims, 1 Drawing Sheet

(51) Int. Cl.
  *G02B 5/13* (2006.01)
  *C08K 3/40* (2006.01)
  *G02B 5/136* (2006.01)

(58) Field of Classification Search
  USPC .......... 359/534, 536–540, 542, 546–547
  See application file for complete search history.

(56) References Cited

U.S. PATENT DOCUMENTS

| | | | |
|---|---|---|---|
| 3,252,376 A * | 5/1966 | De Vries | G02B 5/128 |
| | | | 359/539 |
| 3,254,563 A * | 6/1966 | De Vries | B29D 11/00615 |
| | | | 359/539 |
| 3,418,896 A | 12/1968 | Rideout | |
| 3,493,403 A | 2/1970 | Tung | |
| 3,709,706 A | 1/1973 | Sowman | |
| 3,836,226 A | 9/1974 | Cechetini | |
| 3,935,158 A | 1/1976 | Watanabe | |
| 4,505,967 A | 3/1985 | Bailey | |
| 4,511,210 A | 4/1985 | Tung | |
| 4,564,556 A | 1/1986 | Lange | |
| 4,664,966 A | 5/1987 | Bailey | |
| 4,983,458 A | 1/1991 | Dejaiffe | |
| 4,988,541 A | 1/1991 | Hedblom | |
| 5,750,191 A | 5/1998 | Hachey | |
| 5,774,265 A | 6/1998 | Mathers | |
| 5,777,791 A | 7/1998 | Hedblom | |
| 5,835,271 A | 11/1998 | Stump | |
| 5,880,885 A * | 3/1999 | Bailey | G02B 5/124 |
| | | | 359/529 |
| 5,942,280 A | 8/1999 | Mathers | |
| 6,245,700 B1 | 6/2001 | Budd | |
| 7,513,941 B2 | 4/2009 | Frey | |
| 7,524,779 B2 | 4/2009 | Frey | |
| 7,820,083 B2 | 10/2010 | Bjorklund | |
| 8,591,044 B2 | 11/2013 | Budd | |
| 8,591,045 B2 | 11/2013 | Budd | |
| 10,858,496 B2 * | 12/2020 | Wilding | C08L 23/14 |
| 2002/0146538 A1 * | 10/2002 | Hedblom | E01F 9/524 |
| | | | 428/143 |
| 2003/0051807 A1 | 3/2003 | Yamaguchi | |
| 2003/0090800 A1 * | 5/2003 | Humpal | G02B 5/128 |
| | | | 359/551 |
| 2005/0001342 A1 | 1/2005 | Durant | |
| 2005/0100709 A1 | 5/2005 | Bescup | |
| 2005/0157389 A1 | 7/2005 | Shipman | |
| 2005/0158461 A1 | 7/2005 | Bescup | |
| 2006/0062965 A1 * | 3/2006 | Durant | G02B 5/128 |
| | | | 428/143 |
| 2007/0110960 A1 | 5/2007 | Frey | |
| 2008/0041103 A1 | 2/2008 | Kramlich | |
| 2008/0280034 A1 | 11/2008 | Mathis | |
| 2009/0181213 A1 | 7/2009 | Durant | |
| 2009/0202298 A1 * | 8/2009 | Bjorklund | E01C 23/166 |
| | | | 404/77 |
| 2009/0291292 A1 * | 11/2009 | Bescup | G02B 5/128 |
| | | | 428/323 |
| 2010/0221419 A1 | 9/2010 | Frey | |
| 2013/0215510 A1 * | 8/2013 | Gelfant | G02B 1/12 |
| | | | 359/540 |
| 2014/0193576 A1 | 7/2014 | Carlson | |

FOREIGN PATENT DOCUMENTS

| | | |
|---|---|---|
| CA | 2701269 | 10/2010 |
| CN | 101434823 | 5/2009 |
| DE | 2522710 | 1/1976 |
| EP | 0920476 | 6/1999 |
| GB | 1037265 | 7/1966 |
| GB | 2389615 | 12/2003 |
| JP | 62-2121044 | 6/1987 |
| JP | 8-211213 | 8/1996 |
| JP | 8-291512 | 11/1996 |
| JP | 11-508652 | 7/1999 |
| JP | 2001-048586 | 2/2001 |
| JP | 2002-502984 | 1/2002 |
| JP | 2003-268730 | 9/2003 |
| JP | 2007-514635 | 6/2007 |
| JP | 2014-157874 | 8/2014 |
| JP | 2015-507837 | 3/2015 |
| NL | 7300593 | 7/1973 |
| WO | WO 97/01675 | 1/1997 |
| WO | WO 1997-28470 | 8/1997 |
| WO | WO 1997-28471 | 8/1997 |
| WO | WO 1997-38835 | 10/1997 |
| WO | WO 1998-08901 | 3/1998 |
| WO | WO 1998-47830 | 10/1998 |
| WO | WO 1999-14620 | 3/1999 |
| WO | WO 99/40461 | 8/1999 |
| WO | WO 2000-20481 | 4/2000 |
| WO | WO 00/60386 | 10/2000 |
| WO | WO 2001-29587 | 4/2001 |
| WO | WO 2003-38191 | 5/2003 |
| WO | WO 2004-110733 | 12/2004 |
| WO | WO 2005/058596 | 6/2005 |
| WO | WO 2005-073468 | 8/2005 |
| WO | WO 2007-092635 | 8/2007 |
| WO | WO 2008-123862 | 10/2008 |
| WO | WO 2011-022021 | 2/2011 |
| WO | WO 2011-022022 | 2/2011 |
| WO | WO 2013-043884 | 3/2013 |
| WO | WO 2013/109824 | 7/2013 |
| WO | 2014-040335 | 3/2014 |

OTHER PUBLICATIONS

Application of Engineering Plastics, Shanghai People's Publishing House, Aug. 1971, pp. 83-84.
3M Innovation, RETROREFLECTION, 6 pgs., 2005.
Encyclopedia of China, Chemistry (II), Encyclopedia of China Publishing House, 1989, pp. 657.
Encyclopedia of Chemical Engineering, vol. 10, Chemical Industry Press of China, 1996, pp. 240.

* cited by examiner

DURABLE RETROREFLECTIVE ELEMENTS WITH AN IONIC COPOLYMER CORE

CROSS REFERENCE TO RELATED APPLICATIONS

This application is a national stage filing under 35 U.S.C. 371 of PCT/US2016/050411, filed Sep. 6, 2016, which claims the benefit of Provisional Application No. 62/217,500, filed Sep. 11, 2015, the disclosure of which are incorporated by reference in their entirety herein.

TECHNICAL FIELD

The present disclosure relates to retroreflective elements with an ionic copolymer core.

BACKGROUND

Pavement or road markings (e.g., paints, tapes, and individually mounted articles) guide and direct motorists and pedestrians traveling along roadways and paths. Pavement or road markings can be used on, for example, roads, highways, parking lots, and recreational trails. Typically, pavement markings form stripes, bars, and markings for the delineation of lanes, crosswalks, parking spaces, symbols, legends, and the like. Paint was a preferred pavement marking for many years. Retroreflective liquid pavement markings typically include retroreflective elements. Retroreflective liquid pavement marking offer significant advantages over paint, such as increased visibility, retroreflectance, improved durability, and temporary and/or removable marking options. Such retroreflective elements are described in, for example, U.S. Pat. Nos. 5,750,191; 5,774,265; 5,942,280; 7,513,941; 8,591,044; 8,591,045; and U.S. Patent Publication Nos. 2005/0100709 and 2005/0158461, all of which are incorporated herein in their entirety. Commercially available retroreflective elements include, for example, All Weather Elements made by 3M Company of St. Paul, Minn. Typically, a retroreflective element includes a core adjacent to numerous glass or glass ceramic beads that are adhered to the outermost surface of the core by a binder. As is described in, for example, U.S. Patent Publication No. 2005/0100709, the retroreflective elements are applied onto or into liquid roadway or pavement markings or compositions such that at least a portion of most of the retroreflective elements extends above or out of the roadway or pavement marking. Light that is transmitted by a light source (e.g., a streetlight or a car's headlights) is incident on the retroreflective liquid pavement marking (and the retroreflective elements therein) is retroreflected by the retroreflective elements in the roadway marking. Specifically, the glass or glass ceramic beads transmit incident light back toward the incoming light source.

Pavement or road markings are subject to continuous wear and exposure to the elements as well as road chemicals. Consequently, there is a need for the materials used in pavement or road marking compositions that provide durability and retained reflectivity once applied to a surface.

SUMMARY

The disclosed retroreflective element includes a highly durable core with an ionic copolymer. These disclosed retroreflective properties remain intact even after continued application of external forces and stresses. Further, the ionic copolymer allows for bead to be loaded into the ionic copolymer of the core, securely disposed around the perimeter of the core, or both.

In one embodiment the reflective element comprises a core comprising an ionic copolymer and a plurality of beads. In one embodiment, the core uniformly comprises an ionic copolymer. In one embodiment, the core is a composite core. In one embodiment, the plurality of beads are dispersed throughout the composite core. In one embodiment, the plurality of beads are disposed at a portion of the perimeter of the core. In one embodiment, the plurality of beads are disposed at the entire perimeter of the core. In one embodiment, the core is substantially spherical. In one embodiment, the ionic copolymer includes no more than 15 mole percent of ionized units covalently bonded to a polymer backbone as pendant group moieties. In one embodiment, the ionic copolymer is an ionically cross-linked ethylene methacrylic acid copolymer. In one embodiment, the core further comprises a pigment. In one embodiment, the beads are a glass or glass ceramic beads. In one embodiment, the beads have a mean refractive index ranges ranging from 1.5 to 2.6. In one embodiment, the beads have an average diameter ranging from 30 to 200 microns.

In one embodiment, the reflective element further comprises a plurality of second beads. In one embodiment, the second beads are disposed along a portion of the perimeter. In one embodiment, the second beads are disposed at the entire perimeter of the core. In one embodiment, the second beads are dispersed throughout the ionic copolymer of the core. In one embodiment, the second beads are a glass or glass ceramic bead. In one embodiment, the second bead have a second refractive index ranging from 1.5 to 2.6. In one embodiment, the second beads have an average diameter ranging from 30 to 200 microns. In one embodiment, the bead has a first refractive index, and the second bead has a second refractive index that is different that the first refractive index.

In one embodiment, the beads are fixed to the perimeter of the core by one of the ionic copolymer, a softening material, or an adhesive. In one embodiment, the reflective elements are secured to a substrate by an adhesive, paint, resin.

Figure 1:
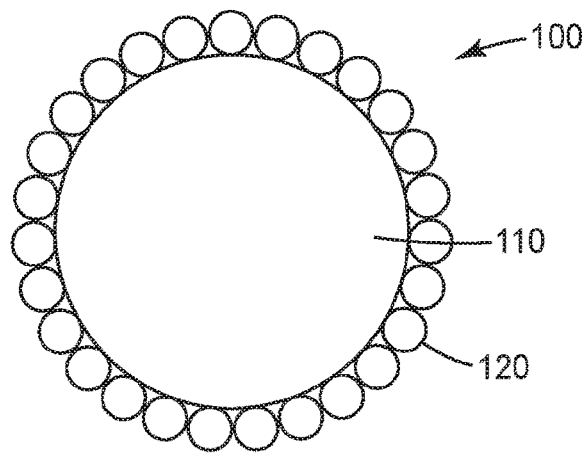
FIG. 1 shows a side-sectional view of a first embodiment of a retroreflective element.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

The term "retroreflective" as used herein refers to the attribute of reflecting an obliquely incident radiation ray in a direction generally antiparallel to its incident direction such that it returns to the radiation source or the vicinity thereof.

The disclosed retroreflective element includes a core and a plurality of beads, which may be located at different locations relative to the core. The core comprises an ionic co-polymer. These disclosed retroreflective properties remain intact even after continued application of external forces and stresses. The retroreflective elements described herein have improved durability properties.

The term "ionic copolymer" as used herein refers to materials that include a fraction of ionized units covalently bonded to a polymer backbone as pendant group moieties. In one embodiment, the ionic copolymer includes no more than 15 mole percent of ionized units covalently bonded to a polymer backbone as pendant group moieties.

In some embodiments, the ionic copolymer is a thermoplastic, which allows for desirable processing using an extruder as compared to thermoset or highly crosslinked materials, like epoxy. In one embodiment, the ionic copolymer has a Shore D hardness between 36 and 68. In one embodiment, the ionic copolymer has a Shore D hardness of 66.

Some exemplary ionic copolymers include those commercially available under the trade designation SURLYN by DuPont de Nemours. In some embodiments, the ionic copolymer is an ionically cross-linked ethylene methacrylic acid copolymer.

Without wishing to be bound by theory, it is believed that the ionic copolymer of the core forms an ionic bond to beads or other additives, like the pigments, thereby increasing the strength and durability of the core. The ion groups can form bonds or crosslinks in the mixture of the composite core to contribute to toughness, hardness of the material. In particular, the ion groups will bond to the glass material of the glass beads. Further, without wishing to be bound by theory, it is believed that the ionic copolymer of the core can form an ionic bond to the underlying substrate (i.e., tape, paint), thereby increasing adhesion of core to the underlying substrate.

Other materials can be included within the retroreflective element. These other materials can be added to the polymer during manufacturing the composite core, or may be added to the polymer prior to manufacturing the composite core. Examples of other materials include pigments, UV stabilizers, heat stabilizers, antioxidants, processing aids, and skid-resistant particles, for examples.

In some embodiments, the core further includes a stabilizing agent that assists in providing UV or heat resistance to the retroreflective element. Exemplary stabilizing agents include, for example, hindered amine light stabilizers (HALS), phosphonate heat stabilizers, benzophenones, and zinc compounds. Stabilizing agents may be present at levels up to about 5 wt %. Some embodiments include one or more plasticizers. In some embodiments, extender resins, often halogenated polymers such as chlorinated paraffins, but also hydrocarbon resins or polystyrenes, are included with the ionic copolymer precursor ingredients, and are miscible with, or form a single phase with, the ionic copolymer.

In some embodiments, the ionic copolymer and optional ingredients are mixed to form a relatively homogeneous mixture, wherein fillers and other materials insoluble in the ionic copolymer are dispersed randomly three-dimensionally throughout the ionic copolymer. An extruder is suitable for this purpose. These optional ingredients can contribute to the improved durability and toughness of the core.

The core of the retroreflective element of the present disclosure can be any desired color, including, for example, white or yellow. The core of the retroreflective element can be colored in any way known in the art, including, for example, inclusion of one or more of organic pigments, inorganic pigments and whitening agents.

Examples of useful organic pigments include halogenated copper phthalocyanines, aniline Blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, BON arylamides, quinacridones, perylenes, anthraquinones, dibromanthrones, pyranthrones, diketopyrrolo-pyrrole pigments (DPP), dioxazine violets, copper and copper-free phthalocyanines, Indanthrones, and the like.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead molybdate, cadmium red, red iron oxide, prussian blue, ultramarine, cobalt blue, chrome green (Brunswick green), chromium oxide, hydrated chromium oxide, organic metal complexes, lake dye pigments and the like.

Exemplary whitening agents include, for example, $TiO_2$, barium sulfate, and zinc oxide. In embodiments including $TiO_2$, the composition may include, for example, from about 0.1 or about 0.5 or about 5 wt. % to about 5 or about 10 or about 15 wt. % $TiO_2$. In some embodiments, the compositions comprise a whitening agent or a yellow organic pigment. In some embodiments, the composition comprises from about 0.5 wt. % to about 2.5 wt. % of an organic yellow pigment.

The core may optionally include one or more fillers. Useful fillers are typically solids that are non-reactive with the other components of the compositions of the application. Useful fillers include, for example, crushed quartz, ground or light calcium carbonate (with or without a surface-treatment such as a fatty acid, resin acid, cationic surfactant, or anionic surfactant), magnesium carbonate, sulfates such as barium sulfate, alumina, metals in powder form (e.g., aluminum, zinc and iron), bentonite, kaolin clay, talc, glass particles (e.g., frit or fibers), glass beads, metal oxide particles, silica particles, ceramic microspheres, hollow polymeric microspheres (such as those available under the trade designation EXPANCEL 551 DE from Akzo Nobel, Duluth, Ga.), hollow glass microspheres (such as those available under the trade designation K37 from 3M Co., St Paul, Minn.), carbonates, metal oxides, silicates (e.g. talc, asbestos, clays, mica), sulfates, silicon dioxide and aluminum trihydrate.

The filler can also comprise conductive particles (see, for example, U.S. Patent Application Pub. No. 2003/0051807, incorporated herein in its entirety by reference) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like.

In one embodiment, an adhesive is included to bond the bead to the core. In one embodiment, an adhesive is included to bond the retroreflective element to a tape or other substrate, such as a roadway surface. Some exemplary adhesive compositions include pressure sensitive adhesives, thermoplastic resin-containing compositions, heat-activated adhesives (i.e., hot melt adhesives), thermoset adhesives, contact adhesives, acrylic adhesives, epoxy adhesives, urethane adhesives, and combinations thereof.

Any existing retroreflective element such as glass or glass ceramic beads can be used in the retroreflective elements of the present application. This includes, for example, those glass or glass ceramic beads described in U.S. Pat. Nos. 3,493,403; 3,709,706; 4,564,556; and 6,245,700, all of which are incorporated herein in their entirety.

In some embodiments, the glass or glass ceramic beads have mean or average diameters of 30-200 microns. In some embodiments, the glass or glass ceramic beads have mean or average diameters of 50-100 microns. In some embodiments, the glass or glass ceramic beads have mean or average diameters of 60-80 microns.

In some embodiments, the glass or glass ceramic beads have refractive indices of between about 1.5 and about 2.6. In some embodiments, the glass or glass ceramic beads have refractive indices of between about 1.8 and about 2.3. In some embodiments, the glass or glass ceramic beads have a mean refractive index of between about 1.8 and about 2.3. In some embodiments, the glass or glass ceramic beads have a refractive index of between about 1.9 and about 2.4. In some embodiments, the glass or glass ceramic beads have a refractive index of about 1.9. In some embodiments, the glass or glass ceramic beads have a refractive index of about 2.4

Some exemplary glass compositions include those described, for example, in U.S. Pat. Nos. 6,245,700 and 7,524,779, both of which are incorporated herein in their entirety. In some embodiments, the glass or glass ceramic beads include at least one or more of, for example, a lanthanide series oxide, aluminum oxide, $TiO_2$, $BaO$, $SiO_2$, or $ZrO_2$.

In some embodiments, the resulting retroreflective elements have a mean or average diameter of between about 100 microns and about 2000 microns.

In some embodiment, for a single retroreflective element, more than one type of bead is included. For example, beads of different sizes, compositions, or refractive indices can be included with a single retroreflective element. For example, beads having a refractive index greater than 2.3 perform well in wet conditions. For example, larger beads, such as greater than 1000 microns can be effective in wet conditions with a refractive index greater than 1.5. For example, beads having a refractive index ranging between 1.5 to 1.9 perform well in dry conditions. Using a combination of both bead types enhances overall retroreflective element performance, see for example U.S. Application Publication 2005/0100709 A1 and U.S. Pat. No. 5,777,791 incorporated herein by reference.

In some embodiments, the retroreflective elements are essentially spherical, as described in, for example, U.S. Pat. Nos. 5,942,280 and 7,513,941, both of which are incorporated herein in their entirety. In some embodiments, the retroreflective elements are non-spherical, as described in, for example, U.S. Pat. No. 5,774,265 and WO 2013/043884, incorporated by reference herein in its entirety.

The retroreflective elements can have any desired topography. For example, the elements can be roughly spherical overall, with an outer surface of closely packed glass or glass ceramic beads. In some embodiments, the glass or glass ceramic beads are spherical. In one embodiment, the retroreflective element can include protrusions extending from the core with cavities between adjacent protrusions, such as disclosed in WO 2013/043884.

The retroreflective elements described herein can be made, manufactured, or formed by any of several methods. In one embodiment, where the beads are loaded into the ionic copolymer, the glass beads are mixed in with the materials prior to formation of the core and the core is formed using commonly known technique for making a shaped core. For example, U.S. Pat. No. 5,750,191 discloses forming small pellets by extruding the thermoplastic material with any optional materials, or possible with glass beads, to form strands. The strands are then cut to small pieces and processed to form the core.

In one embodiment, where glass beads are applied to the external perimeter of the core, U.S. Pat. No. 5,750,191 discloses a method where the solid core elements are added to a mobile bed of optical elements. In such a method the layer of optical elements together with the movement of the core elements within the mobile bed reduces the tendency of the core elements to melt and fuse together.

The disclosed retroreflective elements can be used with liquid pavement marking. Any known liquid pavement marking can be used with the retroreflective elements described herein. Some exemplary commercially available roadway marking liquid pavement markings capable of use with the retroreflective elements include, for example, Liquid Pavement Marking Series 5000, available from 3M Company, St. Paul, Minn.; HPS-2, available from Ennis-Flint, Thomasville, N.C.; and LS90, available from Epoplex, Maple Shade, N.J. In some embodiments, the liquid pavement marking includes a colorant. In some embodiments, the liquid pavement marking is white or yellow.

Any known process for including or applying retroreflective elements to a liquid pavement marking composition may be used to include or apply the retroreflective elements described herein to a roadway marking or liquid pavement marking. For example, the methods described in the following patents may be used: U.S. Pat. Nos. 3,935,158 and 5,774,265, both of which are incorporated in their entirety herein.

The disclosed retroreflective elements can be used with any substrate to make a pavement marking tape. For example, single or multilayers of materials comprising a resilient polymeric base sheet, a binder layer, optical elements, and optionally a scrim and/or adhesive layer are commonly used to make pavement marking tapes, as described in U.S. Pat. Nos. 4,988,541 and 5,777,791. Additionally, the reflective elements can be embedded into the thermoplastic of a pavement marking tape.

In the embodiment shown in FIG. 1, the retroreflective element 100 comprises a core 110 and a plurality of beads 120 disposed at the perimeter of the core 110. The core is a three-dimensional body, and therefore "perimeter" means at least a portion of the external surface of the core. In one embodiment, the beads are located along a portion of the perimeter of the core 110. In one embodiment, the beads are located along substantially the entire perimeter of the core 110. In one embodiment, a single layer of beads are located along at least a portion of the perimeter of the core 110.

In one embodiment, the beads 120 at the perimeter of the core 110 are generally of the same average particle size and composition. In one embodiment, more than one type of bead 120 is included at the perimeter of the core 110. For example, some beads may be larger or smaller than other beads, of different compositions, or include different refractive indices.

In one embodiment, the beads 120 are fixed to the core 110 by one of a softening material or an adhesive agent disposed on the core 110. In one embodiment, the beads 120 may be fixed to the core 110 by contact with the ionic copolymer.

Figure 2:
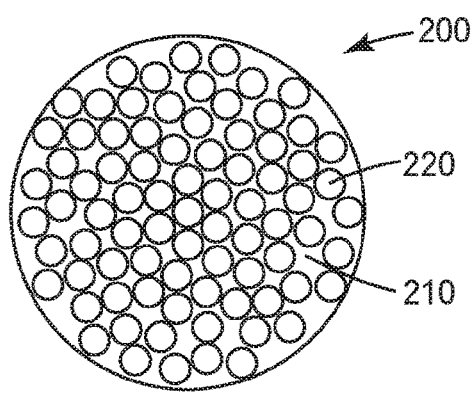
FIG. 2 shows a side-sectional view of a second embodiment of a retroreflective element.
Figure 3:
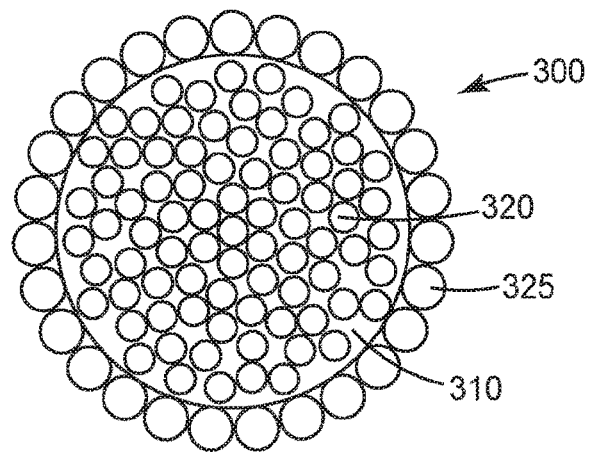
FIG. 3 shows a side sectional view of a third embodiment of a retroreflective element.

In the embodiment shown in FIG. 2, the retroreflective element 200 comprises a core 210, which is a composite of beads 220 dispersed throughout the ionic co-polymer of the core 210. In one embodiment, the beads are uniformly dispersed throughout the ionic co-polymer of the core 210. In one embodiment, the beads are 5-65 volume % of the core. Including too high of a bead loading will impact the mechanical properties of the core. In one embodiment, the beads are 20-35 volume % of the core. In the embodiment shown in FIG. 3, the retroreflective element 300 comprises beads 320 are disposed around at least a portion of a perimeter of the core 310, and the core 310 is a composite of beads 325 dispersed throughout the ionic co-polymer of the core 310. In one embodiment, the beads 320 at the perimeter of the core 310 are the same size and composition as the beads 325 dispersed throughout the ionic copolymer of the core 310. In one embodiment, the beads 320 at the perimeter of the core 310 are different from the beads 325 dispersed throughout the ionic copolymer of the core 310. For example, beads 320 may be larger or smaller than beads 325. For example, beads 320 may be of a different composition than beads 325. For example, beads 320 may have a different refractive index than beads 325. In one embodiment, different beads having different sizes, composition, or refractive indices may be located at the perimeter. In one embodiment, different beads having different sizes, composition, or refractive indices may be loaded in the core.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

Examples

Objects and advantages of the present application are further illustrated by the following examples. The particular materials and amounts thereof recited in the examples, as well as other conditions and details, should not be construed to unduly limit the invention. Those of skill in the art will recognize that other parameters, materials and equipment may be used. All parts, percentages and ratios herein are by weight unless otherwise specified.

Test Methods

Taber Abrasion: Taber abrasion was tested following the procedure described in ASTM D4060-14, "Standard Test Method for Abrasion Resistance of Organic Coatings by the Taber Abraser". About 50 g of Comparative Composite Core A was poured onto a silicone release liner to form a flat disc and then cured at 121° C. for 30 minutes. Composite Cores 1-3 were pressed into 20 cm diameter flat discs of approximately 3 mm thickness using a platen press (Phi model PW-220H) heated to 176.7° C. The discs were then cut into 10 cm square samples and a central 6 mm hole was drilled in them for testing on a Taber Abraser (model, 5130 obtained from Teledyne Taber, North Tonawanda, N.Y.). Samples were tested according for a total of 2000 cycles using CS-17 wheels. Results are reported as a Taber Abraser wear index, wherein the lower the index, the more abrasion-resistant the material is.

Materials

| Trade Designation | Material Description | Vendor Name/Trade Name |
|---|---|---|
| SURLYN 9120 | EMAA ionomer | DuPont USA, Wilmington, DE |
| TI-PURE R104 | Titanium Dioxide | DuPont |
| IRIODIN 9119 WR POLAR WHITE | Pearlescent Pigment | EMD Performance Materials, Philadelphia, PA |
| GLASS BEADS R.I. 1.9 | Glass Beads, 50-100 micron diameter, refractive index 1.9 | Prepared as described below. |

Preparation of Beads
Preparation of Glass Beads Having R.I. 1.9

Glass beads having a refractive index of 1.9 were isolated from 3M Scotchlite™ Reflective Material—8912 Silver Fabric by heating the reflective material to 600° C. for 30 minutes in a muffle furnace, removing and cooling to room temperature, and sieving out the glass beads.

Preparation of Cores
Comparative Core A

Comparative core materials were prepared as generally described in Example 1 of U.S. Patent Publication No. 2005/0100709 (Bescup et al) and are hereinafter referred to as Comparative Core A.

Composite Cores 1-2

Composite Cores 1-2 were prepared by mixing the ingredients (weight %) listed in Table 1, below, in a twin screw extruder and pelletized in a pelletizer. Each one of Composite Cores 1-2 had a final diameter of between about 1.5 mm and about 2 mm diameter and approximately between about 2 mm and 3 mm long.

Composite Cores 3-5

Composite Cores 3-5 were prepared by mixing the ingredients (weight %) listed in Table 1, below, at 200° C. in a measuring mixer with roller rotors attached to a Thermo Scientific HAAKE PolyLab QC Modular Torque Rheometer. Mixed core materials were removed from the mixer and set aside for pressing.

TABLE 1

| Ingredients | Core 1 | Core 2 | Core 3 | Core 4 | Core 5 |
|---|---|---|---|---|---|
| EMAA ionomer | 28.65% | 27.65% | 100% | 55.6% | 28.65% |
| Titanium Dioxide | 0 | 19.62% | 0 | | |
| Pearlescent Pigment | 16.68% | 0 | 0 | 44.4% | 71.35% |
| Glass Beads, 50-100 micron diameter | 54.66% | 52.74% | 0 | 0 | 0 |

Comparative Core A and Composite Cores 1-5 were submitted to the Taber abrasion test described above. Results are reported in Table 2, below.

TABLE 2

| Composite Cores | Taber Wear Index |
|---|---|
| Composite Core 1 | 67 |
| Composite Core 2 | 66 |
| Composite Core 3 | 6 |
| Composite Core 4 | 121 |
| Composite Core 5 | 218 |
| Comparative Core A | 270 |

What is claimed is:

1. A reflective element comprising:
a core defined by a body with a perimeter;
a plurality of first beads disposed around at least a portion of the perimeter of the core,
wherein the core is a composite core comprising an ionic copolymer and a plurality of second beads dispersed through the body of the core,
wherein the first and second beads are glass or glass ceramic beads,
wherein the first beads are different from the second beads,
wherein the first and second beads are retroreflective,
wherein the beads in the body of the core consist essentially of second beads; and
wherein the first bead has a first refractive index, and the second bead has a second refractive index that is different that the first refractive index.

2. The reflective element of claim 1, wherein the core is substantially spherical.

3. The reflective element of claim 1, wherein the ionic copolymer includes no more than 15 mole percent of ionized units covalently bonded to a polymer backbone as pendant group moieties.

4. The reflective element of claim 1, wherein the ionic copolymer is an ionically cross-linked ethylene methacrylic acid copolymer.

5. The reflective element of claim 1, wherein the core further comprises one or more pigments.

6. A device comprising: a substrate, and a plurality of the reflective elements of claim 1, wherein the reflective elements are secured to the substrate by an adhesive, paint, or resin.

7. The reflective element of claim 1, wherein the reflective element has a mean average diameter form 100 microns to 2000 microns.

8. A liquid pavement marking composition comprising the reflective element according to claim 1, and a liquid pavement marking component.

* * * * *

UNITED STATES PATENT AND TRADEMARK OFFICE
CERTIFICATE OF CORRECTION

| | | |
|---|---|---|
| PATENT NO. | : 11,353,640 B2 | Page 1 of 1 |
| APPLICATION NO. | : 15/759044 | |
| DATED | : June 7, 2022 | |
| INVENTOR(S) | : Matthew David Wilding et al. | |

It is certified that error appears in the above-identified patent and that said Letters Patent is hereby corrected as shown below:

In the Claims

<u>Column 10</u>
Line 15, In Claim 7, delete "diameter form 100" and insert -- diameter from 100 --, therefor.

Signed and Sealed this
Eighth Day of October, 2024

Katherine Kelly Vidal
*Director of the United States Patent and Trademark Office*